(12) United States Patent
Geraci et al.

(10) Patent No.: US 10,893,531 B2
(45) Date of Patent: Jan. 12, 2021

(54) RESOURCE ELEMENT ALLOCATION (71) Applicant: Nokia Technologies Oy, Espoo (FI)

(72) Inventors: Giovanni Geraci, Dublin (IE); David Lopez-Perez, Dublin (IE); Holger Claussen, Dublin (IE)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 16/329,432

(22) PCT Filed: Sep. 13, 2017

(86) PCT No.: PCT/EP2017/073039
§ 371 (c)(1),
(2) Date: Feb. 28, 2019

(87) PCT Pub. No.: WO2018/050703
PCT Pub. Date: Mar. 22, 2018

(65) Prior Publication Data
US 2019/0254044 A1  Aug. 15, 2019

(30) Foreign Application Priority Data

Sep. 14, 2016 (EP) ..................................... 16188819

(51) Int. Cl.
*H04W 4/00* (2018.01)
*H04W 72/12* (2009.01)
(Continued)

(52) U.S. Cl.
CPC ........ *H04W 72/121* (2013.01); *H04B 7/0452* (2013.01); *H04L 5/0005* (2013.01);
(Continued)

(58) Field of Classification Search
None
See application file for complete search history.

(56) References Cited

U.S. PATENT DOCUMENTS

| | | | |
|---|---|---|---|
| 2012/0163208 A1* | 6/2012 | Kamble | H04W 72/1231 370/252 |
| 2013/0182594 A1* | 7/2013 | Kim | H04W 72/085 370/252 |

(Continued)

OTHER PUBLICATIONS

Ericsson, "Hybrid CSI Reporting with One and Two CSI Processes," $3^{rd}$ Generation Partnership Project (3GPP), 3GPP TSG-RAN WG1#86, R1-167640, 9 pages, XP051125998, Gothenburg, Sweden, Aug. 22-26, 2016.

(Continued)

*Primary Examiner* — Zewdu A Beyen
(74) *Attorney, Agent, or Firm* — Fay Sharpe LLP (57) ABSTRACT

Aspects and embodiments provide a method of allocating frame resource elements in a wireless communication network for the purpose of channel estimation, and a base station and computer program product operable to perform that method. One aspect provides a method of allocating resource elements in a wireless communication network. The method comprises: determining a channel estimate associated with each user equipment to be scheduled in a given frame; assessing whether a validity time associated with each channel estimation value, e.g. CSI, associated to each user equipment is still valid or should be considered as expired; and allocating the frame resource elements to either channel estimation, when the current channel estimation is not anymore valid, or else to data transmission, when it is still valid. The validity time comprises a number of frames and is selected according to an associated mobility of the user equipment, wherein for semi-static UEs the current channel estimation is considered to be valid for a longer time. Aspects and embodiments provide a method for an adaptive and user-centric frame design in massive MIMO that takes into account mobility of UEs and thus may (Continued)

Example of fixed frame structure mitigate waste of resource associated with use for unnecessary channel estimation purposes.

12 Claims, 4 Drawing Sheets

(51) Int. Cl.
  *H04B 7/0452* (2017.01)
  *H04L 5/00* (2006.01)
(52) U.S. Cl.
  CPC ............ *H04L 5/005* (2013.01); *H04L 5/0044* (2013.01); *H04W 72/1231* (2013.01); *H04L 5/0023* (2013.01); *H04L 5/0085* (2013.01)

(56) References Cited

U.S. PATENT DOCUMENTS

2014/0071955 A1   3/2014   Du et al.
2017/0207843 A1*  7/2017   Jung .................. H04W 74/004

OTHER PUBLICATIONS

Wenxun Qiu et al., "An Efficient Diversity Exploitation in Multiuser Time-Varying Frequency-Selective Fading Channels," IEEE Transactions on Communications, vol. 59, No. 8, pp. 2172-2184, XP011380705, Aug. 2011.

Hien Quoc Ngo et al., "Energy and Spectral Efficiency of Very Large Multiuser MIMO Systems," IEEE Transactions on Communications, vol. 61, No. 4, pp. 1436-1449, Apr. 2013.

Emil Bjornson et al., "Massive MIMO for Maximal Spectral Efficiency: How Many Users and Pilots Should be Allocated?," IEEE Transactions on Wireless Communications, vol. 15, No. 2, pp. 1293-1308, Feb. 2016.

Thomas L. Marzetta, "Massive MIMO: An Introduction," Bell Labs Technical Journal, vol. 20, pp. 11-22, 2015.

Thomas L. Marzetta, "Noncooperative Cellular Wireless with Unlimited Numbers of Base Station Antennas," IEEE Transactions on Wireless Communications, vol. 9, No. 11, pp. 3590-3600, Nov. 2010.

Emil Bjornson et al., "Optimal Design of Energy-Efficient Multi-User MIMO Systems: Is Massive MIMO the Answer?," IEEE Transactions on Wireless Communications, vol. 14, No. 6, pp. 3059-3075, Jun. 2015.

G. Monghal et al, "Qos Oriented Time and Frequency Domain Packet Schedulers for the UTRAN Long Term Evolution," IEEE, pp. 2532-2536, 2008.

"Wrestling with the Data Tsunami," COMMSCOPE, 1 page, 2014.

International Search Report for PCT/EP2017/073039 dated Dec. 11, 2017.

* cited by examiner

Example of fixed frame structure

FIG. 3

Example of Massive MIMO frame structure

Example of conventional channel-ageing-unaware scheduler that does not exploit the up-to-date CSI available for certain UEs

FIG. 6

Example of proposed channel-ageing-aware scheduler that exploits the up-to-date CSI available for certain UEs

RESOURCE ELEMENT ALLOCATION

FIELD OF THE INVENTION

Aspects and embodiments provide a method of allocating frame resource elements in a wireless communication network, and a base station and computer program product operable to perform that method.

BACKGROUND

Wireless telecommunication systems are known. In such systems network connectable devices or mobile communication devices such as user equipment, mobile telephones and similar are typically operable to communicate with base stations provided by network providers.

In known wireless telecommunication systems, radio coverage is provided to network connectable devices within areas known as cells. A base station is located in each cell to provide radio coverage. Typically, network connectable devices in each cell are operable to receive information and data from a base station and to transmit information and data to a base station. Network connectable devices roam through a wireless communication system. A number of base stations are provided and are distributed geographically in order to provide a wide area of coverage to network connectable devices.

The fifth generation of wireless communication systems (5G) aims to meet increased wireless throughput demand. To this end "massive MIMO" (Multi Input Multi Output) is a promising candidate technology. Massive MIMO operation relies on estimating propagation channels between base stations (BSs) and users (UEs). Such channel estimates are obtained through the use of pilot signals.

A fixed frame structure has been proposed for use in massive MIMO systems. According to that structure, time-frequency resources are divided into frames consisting of a multitude of resource elements (REs); one RE being the minimum allocation unit. The duration of a frame is chosen such that the propagation channels of all UEs remain unchanged for the whole frame. For each frame, a fixed number of REs is dedicated to pilot transmission, which is used by the BS to estimate the channels of all scheduled UEs. The remaining REs are used for payload data and are split between uplink and downlink transmissions, as illustrated schematically in FIG. 1.

It is desired to provide an alternative mode of operation within a massive MIMO system.

SUMMARY

A first aspect provides a method of allocating frame resource elements in a wireless communication network, the method comprising: determining a channel estimate associated with each user equipment to be scheduled in a given frame; assessing whether a validity time associated with each user equipment channel estimate is current or has expired; and allocating the frame resource elements to channel estimation or data transmission in dependence upon the assessment.

The first aspect recognises that for each UE, a channel estimation phase is only really required every time its propagation channel has changed. Such changes typically occur more often for mobile UEs, and less often for static UEs. A fixed frame structure such as the one described above does not account for UE mobility, and allocates resources to pilot signals irrespective of whether a channel estimation phase is necessary or not, thus leading to a significant waste of resources. The first aspect recognises that the fixed frame structure is conservative, does not distinguish between static and mobile UEs, and may lead to a high waste of resources. The first aspect recognises that some of the UEs in a system are likely to have a low mobility and that their propagation channels are unlikely to change frequently. When such UEs are scheduled, it may be considered a waste of resource to estimate their channels at every frame. The first aspect recognises that a base station (BS) may be configured such that it is able to decide whether a new channel estimation phase is needed in relation to a UE. If the BS determines that channel estimation is not required in relation to a UE, the corresponding REs which otherwise would have been used for channel estimation may be used for payload data.

Aspects and embodiments may provide a method for an adaptive and user-centric frame design in massive MIMO which takes into account mobility of UEs and thus may mitigate waste of resource associated with use for unnecessary channel estimation purposes. In other words, aspects and embodiments recognise that since typically more than 80% of UEs are static, their channels may not change within the span of a "fixed" frame, and that allowing for reuse of channel estimates across multiple frames can eliminate a need to use resource to obtain new channel estimates, thereby freeing up those resources for payload data and significantly increasing overall network efficiency.

It will be appreciated that system throughput strongly depends on the amount of resources allocated to pilot signals, since if they are used for pilot transmissions, including channel estimation, those resources cannot be used for data transmission.

A first aspect provides a method of allocating frame resource elements in a wireless communication network. That wireless communication network may comprise a MIMO network. The resource elements may comprise resource elements in a frame. The method may comprise: determining a channel estimate associated with each user equipment to be scheduled in a given frame. Determining a channel estimate may comprise assessing whether such a channel estimate has been stored. The method may comprise assessing whether a validity time associated with each user equipment channel estimate is current or has expired. The method may comprise allocating the frame resource elements to channel estimation or data transmission in dependence upon the assessment of whether a validity time associated with each user equipment is current or not. If the channel estimate is assessed to be current, resource elements may not be required for channel estimation and thus may be allocated to data transmission. If the channel estimate has expired, resource elements may be required to perform channel estimation in relation to the scheduled user equipment.

According to some embodiments, assessment of whether a validity time associated with each user equipment channel estimate is current or has expired comprises: determining an indication of mobility associated with each user equipment. A network may be configured to classify user equipment into mobility classes according to how mobile a user equipment is. It will be appreciated that more mobile user equipment are likely to have changing radio channel propagation characteristics. Substantially static user equipment may have relatively stable radio channel propagation characteristics. Rather than assessing the absolute mobility of each user equipment, some embodiments allow for user equipment to be grouped generally according to relative mobility. A validity time may be associated with each mobility group.

According to some embodiments, assessment of whether a validity time associated with each user equipment channel estimate is current or has expired comprises: determining a validity time associated with each user equipment. A validity time may be based on absolute mobility, be associated with a mobility group, or be based on UE identity or other operational characteristics.

According to some embodiments, validity time comprises a whole number of frames. Accordingly, a validity time may be expressed as a number of frames rather than an absolute time or timer, thus minimising requirements for synchronous operation of all nodes in a network.

According to some embodiments, if all of the validity times associated with user equipment to be scheduled in a given frame are assessed to have expired, a preselected proportion of the frame resource elements are allocated to channel estimation. A network operator may choose how to configure a network and thus what proportion of a frame to use for pilot signals and channel estimation compared to data transmission.

According to some embodiments, if all of the validity times associated with user equipment to be scheduled in a given frame are assessed to be current, a preselected proportion of the frame resource elements are allocated to data transmission. According to some embodiments, the preselected proportion of the frame resource elements are allocated to data transmission comprises substantially all resource elements which otherwise were allocated to channel estimation. Accordingly, those resource elements which are not required for channel estimation, since some or all user equipment to be scheduled have a current channel estimate, may be released from channel estimation and used for data transmission to all scheduled user equipment.

According to some embodiments, the wireless communication network comprises a MIMO network in which a base station and user equipment communicate using n antenna, and selecting user equipment to be scheduled in a given frame comprises selecting n/2 user equipment for scheduling. It will be appreciated that load is a factor in overall network throughput and efficiency. Accordingly, a network operator may configure operation such that the number of scheduled user equipment in a frame is chosen for efficiency. It will be appreciated that the ideal or target number of users to be scheduled may be configurable, since optimum overall throughput can depend upon several system parameters as well as the metric being considered. In other words, the number of users to be scheduled may, in some implementations, be greater than n/2 and may, in other implementations, be less than n/2.

According to some embodiments, user equipment to be scheduled in a given frame are selected in dependence upon whether said validity time associated with each user equipment channel estimate is current or has expired. Some aspects may operate such that scheduling also takes into account whether valid channel estimation information is held in relation to user equipment. It will be appreciated that it may be more efficient to schedule user equipment for which valid channel estimation information is already held, since the resource elements which would otherwise be needed for channel estimation can be used for data transmission.

According to some embodiments, the method comprises performing a search over all possible subsets of schedulable user equipment; calculating for each possible subset of schedulable user equipment a subset metric which weights user equipment potential instantaneous performance by average performance, accounting for validity times of all user equipment in a subset and additional throughput associated with frame resource elements which may be allocated to data transmission if the subset of user equipment are scheduled, and selecting a subset in dependence upon the calculated subset metric. Various metrics are possible to balance throughput and fairness.

A second aspect provides a computer program product operable, when executed on a computer, to perform the method of the first aspect.

A third aspect provides a base station configured to allocate frame resource elements in a wireless communication network, the base station comprising: determination logic configured to determine a channel estimate associated with each user equipment to be scheduled in a given frame; assessment logic configured to assess whether a validity time associated with each user equipment channel estimate is current or has expired; and allocation logic configured to allocate said frame resource elements to channel estimation or data transmission in dependence upon the assessment.

According to some embodiments, assessment of whether a validity time associated with each user equipment channel estimate is current or has expired comprises: determining an indication of mobility associated with each user equipment.

According to some embodiments, assessment of whether a validity time associated with each user equipment channel estimate is current or has expired comprises: determining a validity time associated with each user equipment.

According to some embodiments, validity time comprises a whole number of frames.

According to some embodiments, if all of the validity times associated with user equipment to be scheduled in a given frame are assessed to have expired, the allocation logic is configured to allocate a preselected proportion of the frame resource elements to channel estimation.

According to some embodiments, if all of the validity times associated with user equipment to be scheduled in a given frame are assessed to be current, the allocation logic is configured to allocate a preselected proportion of the frame resource elements to data transmission.

According to some embodiments, the preselected proportion of the frame resource elements are allocated to data transmission comprises substantially all resource elements which otherwise were allocated to channel estimation.

According to some embodiments, the wireless communication network comprises a MIMO network in which a base station and user equipment communicate using n antenna, and scheduling logic is configured to select user equipment to be scheduled in a given frame by selecting n/2 user equipment for scheduling.

According to some embodiments, scheduling logic is configured to select user equipment to be scheduled in a given frame in dependence upon whether said validity time associated with each user equipment channel estimate is current or has expired.

According to some embodiments, the scheduling logic is configured to perform a search over all possible subsets of schedulable user equipment; calculate for each possible subset of schedulable user equipment a subset metric which weights user equipment potential instantaneous performance by average performance, account for validity times of all user equipment in a subset and additional throughput associated with frame resource elements which may be allocated to data transmission if the subset of user equipment are scheduled, and select a subset in dependence upon the calculated subset metric.

A fourth aspect provides a method of selecting user equipment to be scheduled in a frame in a wireless communication network, the method comprising: determining a channel estimate associated with each user equipment which could be scheduled in a given frame; assessing whether a validity time associated with each user equipment channel estimate is current or has expired; and selecting whether to schedule each user equipment in dependence upon the assessment.

The fourth aspect recognises that typical scheduling approaches may not be well-suited to implementation in a massive MIMO system. Some aspects recognise that it may be beneficial to recognise the fact that up-to-date channel state information is available for some UEs, and that no channel estimation would be required for those UEs, thus making more resources available for data transmission and potentially allowing for an increase in overall throughput.

The fourth aspect recognises that the scheduling method implemented by a scheduler could exploit mobility state information. In other words, a scheduling algorithm implemented by a scheduler may take into account the fact that the achievable throughput for all UEs is higher when static UEs are scheduled in consecutive frames. In fact, those UEs would not require a training phase and, if used in conjunction with an adaptive frame structure, more REs could be used for data transmission.

The fourth aspect recognises, whenever this does not infringe fairness, a mobility-aware scheduler may be configured to implement an algorithm which tends to allocate consecutive transmissions to some static UEs, thus reducing the number of REs used for pilot transmission, and increasing the overall throughput.

According to some embodiments, the method comprises: selecting user equipment to schedule by including a bias which accounts for additional resources made available by selecting user equipment whose channel estimates are current.

According to some embodiments, the method comprises performing a search over all possible subsets of schedulable user equipment; calculating for each possible subset of schedulable user equipment a subset metric which weights user equipment potential instantaneous performance by average performance, accounting for validity times of all user equipment in a subset and additional throughput associated with frame resource elements which may be allocated to data transmission if a possible subset of user equipment are scheduled, and selecting a subset in dependence upon the calculated possible subset metric. Various metrics are possible to balance throughput and fairness.

A fifth aspect provides a computer program product operable, when executed on a computer, to perform the method of the fourth aspect.

A sixth aspect provides a scheduler configured to select user equipment to be scheduled in a frame in a wireless communication network, the scheduler comprising: determination logic configured to determine a channel estimate associated with each user equipment which could be scheduled in a given frame; assessment logic configured to assess whether a validity time associated with each user equipment channel estimate is current or has expired; and scheduling logic configured to select whether to schedule each user equipment in dependence upon the assessment.

According to some embodiments, the scheduling logic is configured to select user equipment to schedule by including a bias which accounts for additional resources made available by selecting user equipment whose channel estimates are current.

According to some embodiments, the scheduling logic is configured to perform a search over all possible subsets of schedulable user equipment; calculate for each possible subset of schedulable user equipment a subset metric which weights user equipment potential instantaneous performance by average performance, account for validity times of all user equipment in a subset and additional throughput associated with frame resource elements which may be allocated to data transmission if a possible subset of user equipment are scheduled, and select a subset in dependence upon the calculated possible subset metric.

Further particular and preferred aspects are set out in the accompanying independent and dependent claims. Features of the dependent claims may be combined with features of the independent claims as appropriate, and in combinations other than those explicitly set out in the claims.

Where an apparatus feature is described as being operable to provide a function, it will be appreciated that this includes an apparatus feature which provides that function or which is adapted or configured to provide that function.

BRIEF DESCRIPTION OF THE DRAWINGS

Embodiments of the present invention will now be described further, with reference to the accompanying drawings, in which.

DESCRIPTION OF THE EMBODIMENTS

Before discussing the embodiments in any more detail, first an overview will be provided.

Figure 1:
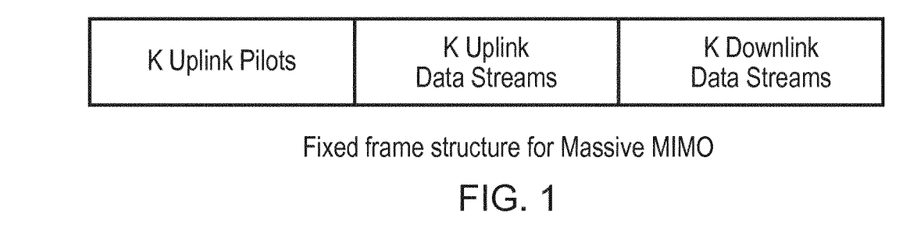
FIG. 1 illustrates a fixed frame structure for use in a massive MIMO system.

Arrangements described may provide an adaptive method for channel estimation that addresses some shortcomings associated with a fixed frame arrangement such as that illustrated schematically in FIG. 1 and according to which time-frequency resources are divided into frames consisting of a multitude of resource elements (REs); one RE being the minimum allocation unit. The duration of a frame is chosen such that the propagation channels of all UEs remain unchanged for the whole frame. For each frame, a fixed number of REs is dedicated to pilot transmission, which is used by the BS to estimate the channels of all scheduled UEs. The remaining REs are used for payload data and are split between uplink and downlink transmissions.

Arrangements described operate such that instead of treating all UEs the same, a network may be configured to use mobility state information and classify UEs in mobility classes, for example, (i) Class 1: mobile UEs, and (ii) Class 2: static UEs.

Arrangements recognise that, instead of adopting a fixed frame structure according to which a fixed number of REs are used for channel estimation and the remaining ones are used for data transmission, it is possible and may be advantageous to implement an adaptive frame structure, according to which the number of REs used for channel estimation, and thus also the number of Res available for payload data, may change.

According to some arrangements, rather than estimating propagation channels of all scheduled UEs at every frame, a network may be configured to estimate channels in relation to those UEs whose mobility is such that it is likely the channel estimation which has already been performed is outdated and their channel propagation is likely to have altered.

In general, arrangements may operate according to the following basic steps:

ABS may be configured to periodically acquire mobility state information for each of its UEs, determining for each UE a mobility class and corresponding channel coherence time.

For each UE scheduled for transmission, a BS may be configured to decide whether a channel estimation phase is required or not. That decision may be taken based on a UE mobility class and information relating to when a UE last had channel estimation performed.

ABS may be configured to allocate REs for channel estimation only to those UEs which require it. For the remaining UEs, a BS may be configured to re-use previously obtained estimated channel state information.

Arrangements may provide a significant performance gain compared to a fixed frame arrangement in which a fixed number of REs is reserved for channel estimation, irrespective of whether channel estimation is needed in relation to a UE or not. Such an arrangement may lead to a significant waste of resources that could be more efficiently used for data transmission. According to arrangements, REs may be reserved for channel estimation only when needed. When channel estimation is not needed, those REs which would have been used for channel estimation can be made available for data transmission, thus increasing network throughput.

Example System

A massive MIMO multiuser system may be provided according to which transmitting BS may be equipped with multiple antennas and be configured to simultaneously serve K UEs through spatial multiplexing.

Different UEs in the system will typically have different mobility patterns, for example, some are substantially static while others are more mobile. The UEs can be classified according to their mobility and placed into mobility classes m=1, ..., M.

Movement of a UE within a geographical area served by a BS changes its channel propagation features, hence according to one arrangement, a network may be configured such that each mobility class m corresponds to an appropriately selected channel coherence time $T_m$. A highly mobile UE may be assigned to a mobility class associated with a short coherence time and vice versa. ABS may be configured to acquire, for example, periodically, mobility state information (MSI) for each of its UEs, thus determining UE mobility class and corresponding channel coherence time. $C_k$ is the mobility class of the k-th UE.

EXAMPLE

Implementation of a simple one-bit MSI may allow a network to classify UEs into two mobility classes: Class 1 (mobile UEs) and Class 2 (static UEs), depending on whether their speed falls above or below a certain threshold.

In one example implementation, static UEs may be allocated a coherence time which is triple that associated with mobile UEs, i.e.

Class 1 (mobile): $T_1=T$
Class 2 (static): $T_2=3T$

Proposed Adaptive Frame Structure

According to arrangements an adaptive frame design may be implemented according to which BSs independently decide the frame structure according to load and mobility in their own cell.

According to some arrangements, frame length T may be determined by the coherence time of the most "mobile" UE class. Such arrangements may ensure that up-to-date channel state information is always available at a BS, irrespective of the mobility class of UEs.

A scheduling algorithm is typically run by a BS at the beginning of each frame interval. The scheduler is configured to choose a set of UEs to be served in a current frame. For each scheduled UE, its mobility class and its previous allocation history determine whether that UE requires a new channel estimation (training) phase or whether previously estimated channel state information can be re-used. In the latter case, the UE does not need to send a pilot signal in the current frame, and more resources can be made available for data transmission for all UEs.

For each scheduled UE, the BS knows the following: (i) its mobility class $C_k$ and corresponding coherence time $T_k$, and (ii) the number of frames $F_k$ since the UE was last trained (including the current frame). ABS may be configured to then decide as follows:

If $F_k \leq T_k/T$, the UE does not require a new training phase.
If $F_k > T_k/T$, the UE requires a new training phase.

The BS may be configured to then allocate RE for training (pilot signals) only to those UE that require a new training phase. For the remaining UEs, previous estimates of their channels will be used. In fact, if a UE belongs to the mobility class $C_k$, then it will be appreciated that it may be scheduled for up to $T_k/T$ consecutive frames with no need for new training.

EXAMPLE

Figure 2:
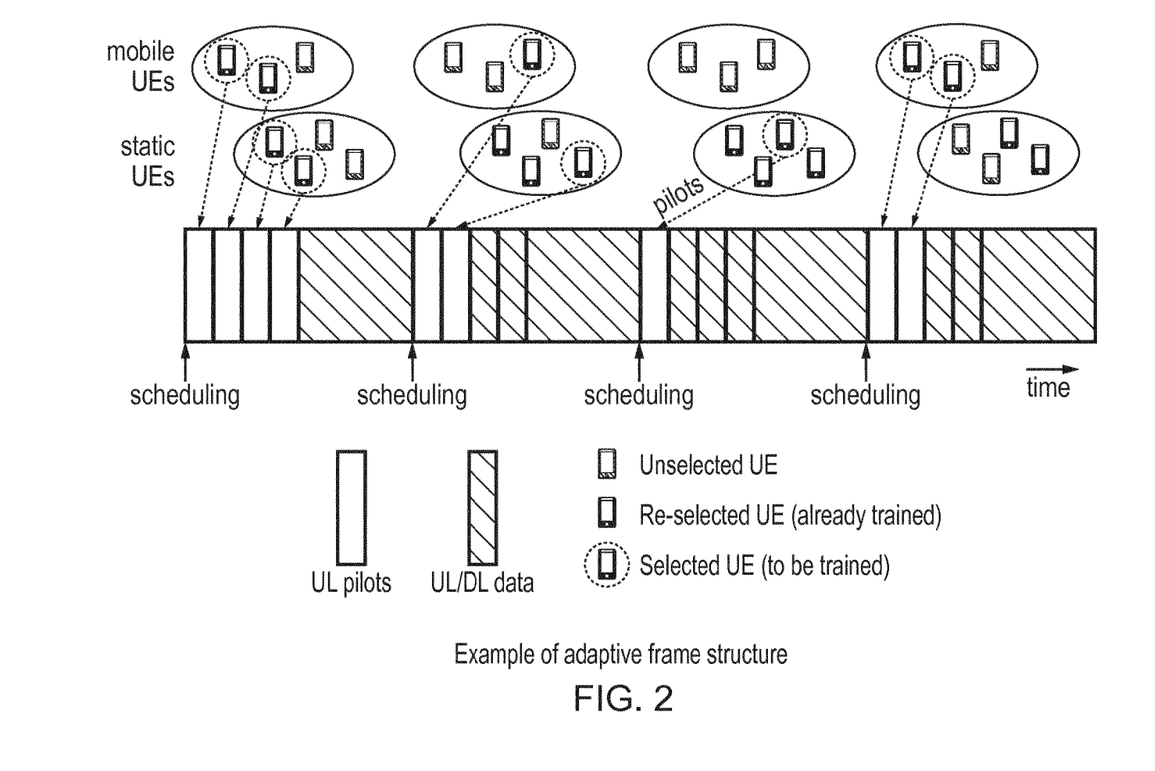
FIG. 2 illustrates schematically possible operation of an arrangement configured to implement one possible adaptive frame structure.

FIG. 2 illustrates schematically possible operation of an arrangement configured to implement one possible adaptive frame structure. In the example illustrated, each frame consists of 8 REs and K=4 UEs are served simultaneously through spatial multiplexing. When static UEs are scheduled for transmission in consecutive frames, provided a BS determines that training is not needed for them, REs which otherwise would be used for channel estimation can be used by all K=4 UEs for data transmission.

Performance

An adaptive frame structure according to described arrangements can be simple, ultra flexible, and scalable to a generic number of mobility classes without significant increase in complexity. Moreover, it can achieve a large performance improvement with respect to a fixed frame structure. In fact, in a system with fixed frame structure, the frame is designed according to the worst case, i.e., the most mobile UEs which require a new training phase at each frame. Under a fixed frame structure, a new training phase is allocated to all scheduled UEs, irrespective of their mobility class.

EXAMPLE

FIG. 2 provides an example of one possible adaptive frame design. FIG. 2 illustrates scheduled UEs and pilot allocation for 4 frames of 8 REs each. In the example shown in FIG. 2, out of the 32 REs, only 9 REs are used for pilots and the remaining 23 REs are used for data transmission. This is made possible by the fact that some scheduled UEs are static, and they do not need a new training phase (channel phase estimation) when they are scheduled in consecutive frames since they are within their associated coherence time.

Figure 3:
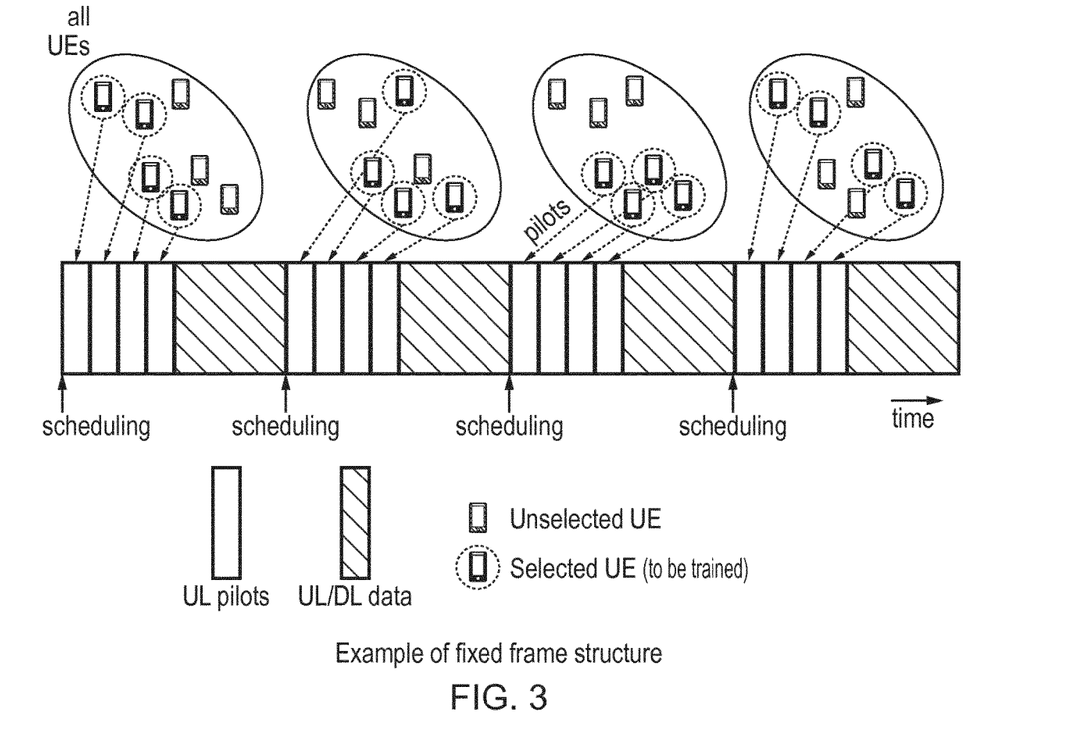
FIG. 3 illustrates schematically possible operation of an arrangement configured to implement a fixed frame structure.

FIG. 3 illustrates schematically possible operation of an arrangement configured to implement a fixed frame structure in which UEs are not classified into mobility classes. In this case, all UEs require training in every frame they are scheduled. In FIG. 3, 16 REs out of the 32 REs are used for pilots and only 16 REs are available for data transmission.

It can be seen that appropriate methods may provide a method for adaptive frame design in massive MIMO. More specifically:

Preferred embodiments of the invention may ensure a large throughput gain compared to the best existing solution. This is achieved by avoiding the use of some unnecessary channel estimation phases, and by allocating the corresponding REs to data transmission. Methods may be simple and scalable to a generic number of UEs and mobility classes, without significant increase in complexity. Moreover, the throughput gain may increase with the number of mobility classes and available UEs. In practical systems where the majority of UEs are static, methods may offer a large performance gain over a fixed frame structure method. In fact, since a fixed frame structure is conservatively designed according to the worst case, i.e., that all UEs belong to the most mobile class, a fixed frame structure may prove highly inefficient when the majority of UEs are static. Methods may overcome that flaw. Methods may be implemented at various BSs in a decentralized fashion, without requiring coordination and time-synchronous transmission, which may be difficult to obtain over a large coverage area. Although pilot signals and data sequences are not synchronized across cells, the total amount of interference during the training phase if methods are implemented according to an adaptive frame structure does not change in any substantial way.

Mobility-Aware Scheduling

In a network which includes a number of UEs allocating transmission resources both fairly and efficiently is a challenging problem. That problem becomes more challenging if the UEs are experiencing different channel propagation conditions.

Typically a scheduling algorithm is run at each BS at the beginning of each frame, in a distributed fashion. The scheduler selects UEs for transmission according to a certain criterion, for example: throughput, fairness, quality of service, etc.

Three main classes of approach currently exist:

Round Robin Schedulers

A Round Robin scheduler is configured to treat UEs equally regardless of their channel quality, allocating them the same share of resources. This criterion ignores and does not attempt to maximize the network throughput achieved.

Opportunistic Schedulers

An opportunistic scheduler is configured to select the UE with the best channel quality, aiming at maximizing the overall throughput only. This approach can increase system throughput remarkably compared to Round Robin schedulers. However, the gain achieved by opportunistic schedulers comes at the cost of fairness, since UEs with relatively bad channel qualities may be never scheduled. This may not be acceptable for certain scenarios, e.g., delay-sensitive applications.

Proportional Fair Schedulers

A Proportional Fair (PF) scheduler is configured to balance throughput and fairness considerations and attempts to maximize the throughput while simultaneously reinforcing a degree of fairness in serving all UEs. The PF scheduling metric weighs each UE's potential instantaneous throughput by its past average throughput. UEs are ranked according to the metric, and those UEs with maximum metric are scheduled for transmission.

While to some extent better than Round Robin and Opportunistic schedulers, PF schedulers may not be suited to some applications. It is desired to provide an alternative scheduling method.

Some aspects recognise that typical scheduling approaches may not be well-suited to implementation in a massive MIMO system. Some aspects recognise that it may be beneficial to recognise the fact that up-to-date channel state information is available for some UEs, and that no channel estimation would be required for those UEs, thus making more resources available for data transmission and potentially allowing for an increase in overall throughput.

Some aspects recognise that the scheduling method implemented by a scheduler could exploit mobility state information. In other words, a scheduling algorithm implemented by a scheduler may take into account the fact that the achievable throughput for all UEs is higher when static UEs are scheduled in consecutive frames. In fact, those UEs would not require a training phase and, if used in conjunction with an adaptive frame structure, more REs could be used for data transmission.

Some aspects recognise that, whenever this does not infringe fairness, a mobility-aware scheduler may be configured to implement an algorithm which tends to allocate consecutive transmissions to some static UEs, thus reducing the number of REs used for pilot transmission, and increasing the overall throughput.

Some aspects provide a scheduling method that accounts for channel ageing in its metric, i.e., accounting for the fact that up-to-date CSI is available for some UEs, while the CSI available for other UEs has aged.

Methods to schedule users in massive MIMO systems according to CSI ageing are described. One possible method addresses the shortcomings of a conventional PF scheduler, as follows: rather than ignoring the fact that up-to-date channel state information may be available for some UEs, it is configured to take that information into account in the process of scheduling UEs for transmission. Instead of using a conventional proportional fair metric to choose UEs for transmission, a scheduler may implement an algorithm which includes a bias in the metric that accounts for additional resources made available by selecting those UEs whose channels do not need to be estimated.

Before discussing the embodiments in any more detail, first an overview will be provided.

Scheduling methods according to some arrangements may comprise the following basic steps: each BS may periodically acquire information to determine the channel coherence time of each UE. For each of the UEs schedulable for transmission, a BS may be configured to decide whether a new channel estimation phase is required (because the CSI has aged) or not (because the CSI is still up to date). This decision is taken based on (i) each UE's coherence time, (ii) when that UE's channel was last estimated and (iii) the UE's buffer load (UEs with no data to transmit will not be trained). ABS may then be configured to choose a set of UEs to be served accounting for the above, i.e. bearing in mind that a UE that does not require a channel estimation phase is likely to make some resources available for data transmission.

Such scheduling methods may provide a significant performance gain over an arrangement in which UEs are scheduled for transmission irrespective of whether up-to-date CSI is available for them or not, i.e., whether a new training phase is required or not. This may lead to a significant waste of resource. Scheduling methods according to some arrangements may account for the fact that in some networks some resource elements (REs) may be made available for data transmission by re-scheduling (whenever this does not infringe fairness) those UEs whose CSI has not aged, and therefore does not need to be estimated again.

Scheduling System Model & Example

A massive MIMO multiuser system may be provided in which a transmitting BS serves a set of U UEs. Since the BS is equipped with multiple antennas, up to K≤U UEs can be simultaneously served through spatial multiplexing.

Each UE k, k=1, . . . , K, has a channel coherence time $T_k$, defined as the time interval during which its channel propagation features have not changed. The frame length T is determined by the smallest coherence time across all UEs. This ensures that the CSI remains up-to-date for the entire duration of a frame.

Figure 4:
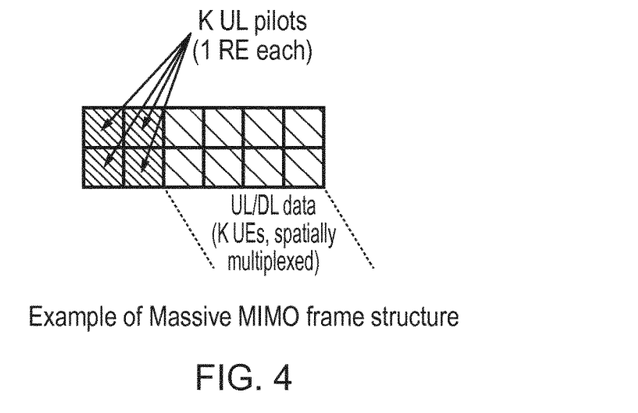
FIG. 4 illustrates schematically one example of a Massive MIMO frame structure.

For each frame, a fixed number of resource elements (REs) is dedicated to pilot transmission, which is used by the BS to estimate the channels of scheduled UEs. The remaining REs are used for payload data and are split between uplink and downlink transmissions, as illustrated in FIG. 4.

It is assumed that, for each UE k, a BS has knowledge of $T_k$, for example, because $T_k$ is a function of the UE mobility/speed which can be periodically estimated. Therefore, for each UE k, a BS may also know the following: (i) UE coherence time $T_k$; (ii) time $E_k$ elapsed since the UE's channel was last estimated through a training phase.

If there is data in a UE DL and/or UL buffer, the two following cases can occur:
- If $E_k$≤T−T, then the UE does not require a new training phase if scheduled (the CSI has not aged yet, i.e., it is up to date).
- If $E_k$>$T_k$−T, then the UE requires a new training phase if scheduled (the CSI has already aged, i.e., it is outdated).

In fact, UE k can be scheduled for up to $T_k$/T consecutive frames with no need for new training. As a result, a BS may be configured to allocate training resources (pilot signals) only to those scheduled UE that require a new training phase. For the remaining scheduled UEs, previous estimates of their channels can be used.

Channel-Ageing-Aware Scheduler

A scheduling algorithm is run at each BS at the beginning of each frame interval in a distributed fashion. The aim of the scheduler is to choose a set of K UEs to be served in the current frame, where the set of UEs should maximize the system throughput while simultaneously reinforcing a degree of fairness in serving all UEs.

A scheduler according to some arrangements may be configured to select UEs for transmission according to throughput and fairness. Unlike conventional PF schedulers a channel-ageing-aware scheduler takes into account not only
  (i) instantaneous throughput and
  (ii) past average throughput, but also
  (iii) coherence time and
  (iii) previous channel training history of each UE.

For each schedulable UE, its coherence time and its previous channel training history determine whether the UE would require a new channel estimation phase (because its CSI has aged) or previously estimated CSI could be re-used (because it has not aged yet). In the latter case, the UE would not need to send a pilot signal in the current frame and, in some networks, more REs may be made available for data transmission for all UEs. Therefore, whenever this does not infringe fairness, a channel-ageing-aware scheduler may be configured to tend to allocate consecutive transmissions to some UEs for which an up-to-date channel estimate is available, thus reducing the number of REs used for pilot transmission, and increasing the overall throughput.

Three possible implementations of a channel-ageing-aware scheduler are now described in detail. The first implementation comprises a method according to which an exhaustive search over all possible subsets of schedulable UEs is performed, and for each subset of UEs a subset metric is jointly calculated, and a max-min criterion is used for subset selection. The second implementation also comprises a method according to which an exhaustive search is performed, but a max-average criterion is used for subset selection. The third implementation comprises a method according to which a ranking procedure is performed, and for each UE an individual metric is calculated. The UEs are then ranked and selected according to this metric.

Implementation 1: Max-Min Channel-Ageing-Aware Scheduler

In a first implementation, the scheduler may be configured to calculate the following metric for each possible subset S of UEs $$\gamma_S \triangleq \min_{k \in S} \{\gamma_k\},$$

and select a subset S* with the highest metric as follows $$S^* = \arg\max_s \gamma_s.$$

For each UE k in S, the metric $\gamma_k$ is calculated as $$\gamma_k = \frac{R_k + A_S}{\overline{R}_k},$$

where the quantity $\overline{R}_k$ denotes the past average throughput for the k-th UE and is calculated using a moving average, $R_k$ denotes the potential instantaneous throughput achievable in the data-only REs, and $A_s$ denotes the additional throughput achievable in some extra REs made available by those UEs in S for which a new channel estimation is not needed.

While $\overline{R}_k$ and $R_k$ are defined similarly to conventional channel-ageing-unaware PF schedulers, the bias $A_s$ accounts for the additional throughput that UE k would achieve in those resource elements made available by unused training resources. The number of such additional available REs is equal to the number of scheduled UEs in S that do not require a new training phase, i.e., those for which $E_k$≤$T_k$−T holds.

In other words, the metric $\gamma_k$ weighs the UE's potential instantaneous performance by its average performance, accounting for the coherence time $T_k$ and previous training history $E_k$ of all UEs in S. In fact, if $E_k$≤$T_k$−T for some of the UEs in S, then they need no training phase, they make available additional resource elements for all UEs in S for data transmission, and the potential throughput is higher for all UEs in S (it increases by a quantity $A_s$).

As a result of use of the metric $\gamma_s$, a channel-ageing-aware scheduler is configured to tend to allocate up to $T_k/T$ consecutive transmissions to some UEs, as long as other UEs are not deferred transmission for too long. Such a scheduling strategy may increase overall throughput.

Implementation 2: Max-Average Channel-Ageing-Aware Scheduler

In a second implementation, a scheduler may be configured to calculate the following metric for each possible subset S of UEs $$\gamma_s = \frac{1}{K}\sum_{k \in S}\gamma_k,$$

where for each UE k, $\gamma_k$ is given by $$\gamma_k = \frac{R_k + A_S}{\overline{R}_k}$$

as in the first implementation. The scheduler may then be configured to select a subset S* with the highest metric as follows $$S^* = \arg\max_s \gamma_s.$$

The criterion used in this second implementation is similar to the one in the first implementation, but places more emphasis on the average metric of the subset, rather than maximizing the worst case in the subset.

Implementation 3: Low-Complexity UE Ranking

In a third implementation, a channel-ageing-aware scheduler may be configured to calculate the following individual metric for each UE k $$\gamma_k = \frac{R_k + K \cdot A_k}{\overline{R}_k},$$

and select the K UEs with the highest metric $\gamma_k$. As in the previous implementations, the metric $\gamma_k$ weighs the UE's potential instantaneous performance by its average performance, $\overline{R}_k$. However, in this implementation, the instantaneous performance $R_k + K \cdot A_k$ includes a bias $K \cdot A_k$ given by the number of scheduled UEs K, times the additional throughput $A_k$ made available by UE k to each of the K scheduled UEs, including itself. Specifically, $A_k \neq 0$ whenever $E_k \leq T_k - T$.

In this third implementation, the bias $K \cdot A_k$ accounts for the fact that a scheduled UE that does not require a new training phase will increase the instantaneous throughput of all K scheduled UEs by a quantity $A_k$.

Performance

Scheduling methods according to arrangements may be simple and flexible. In particular, the third implementation, "low-complexity UE ranking", is scalable to a generic number of UEs without significant increase in complexity. Moreover, scheduling methods and schedulers according to some arrangements can achieve a large performance improvement if compared to a conventional channel-ageing-unaware PF scheduler.

According to typical operation of a channel-ageing-unaware scheduler, transmission opportunities are allocated irrespective of whether UEs require a new training phase at each frame. According to some described scheduling methods, some UEs for which an up-to-date CSI is already available at the BS are allocated consecutive transmissions where possible, thus potentially making more resources available for data transmission for all scheduled UEs.

EXAMPLE

Figure 5:
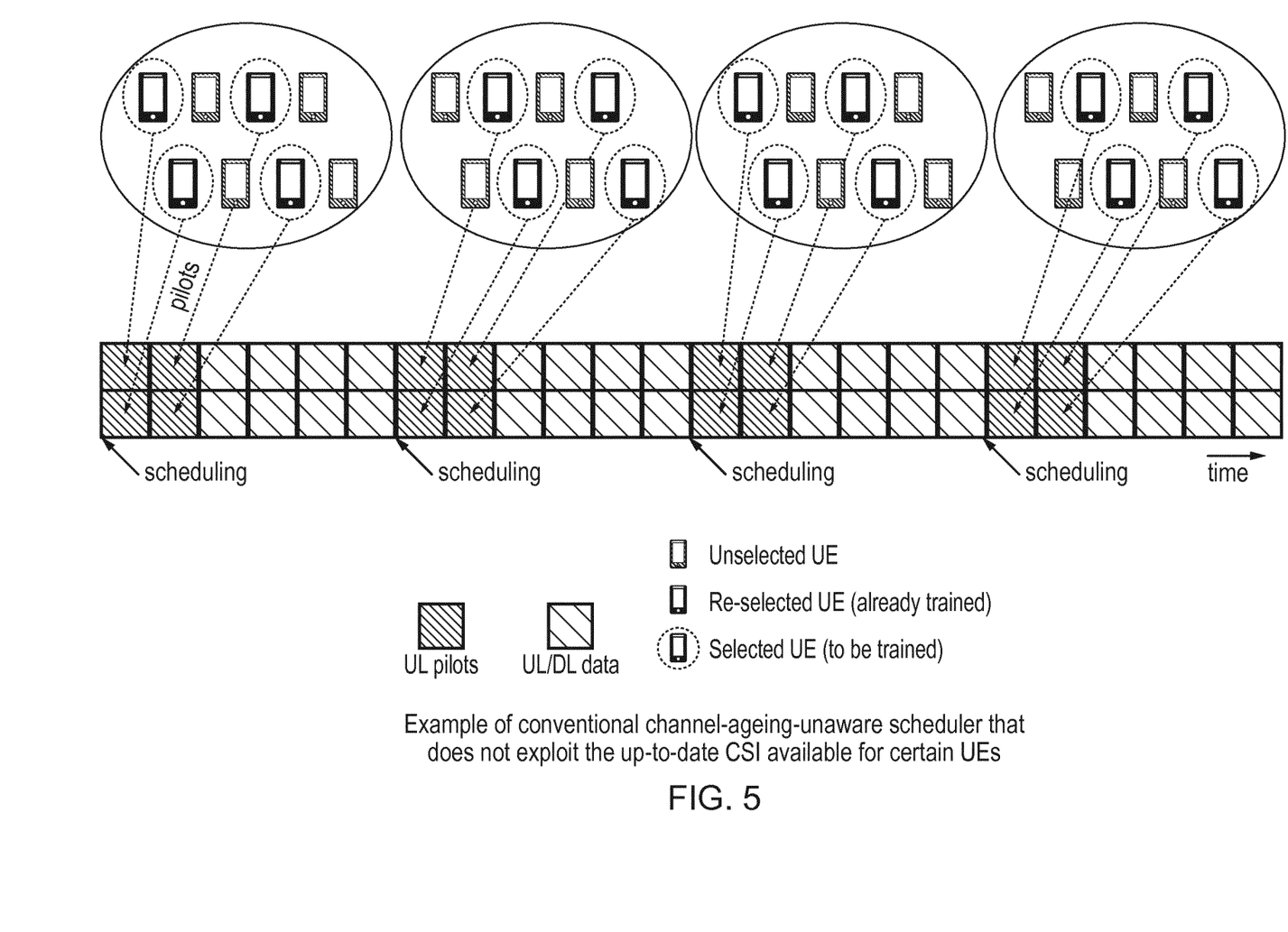
FIG. 5 illustrates schematically operation of one possible conventional channel-ageing-unaware scheduler.

FIG. 5 illustrates schematically operation of one possible conventional channel-ageing-unaware scheduler. According to the simple example of a conventional scheduling algorithm shown in FIG. 5, each frame consists of 12 REs, and all UEs are assumed to have a coherence time $T_k = 2 \cdot T$, $\forall k$. FIG. 5 illustrates schematically scheduling which occurs over 4 example frames.

In the example shown, out of a total of U=8 schedulable UEs, K=4 UEs are scheduled and served simultaneously through spatial multiplexing. In the example of FIG. 5, the scheduler is configured to ignore the fact that by scheduling a UE in two consecutive frames, that UE would not require a new training phase and its corresponding RE could be instead used to transmit data to all UEs.

Figure 6:
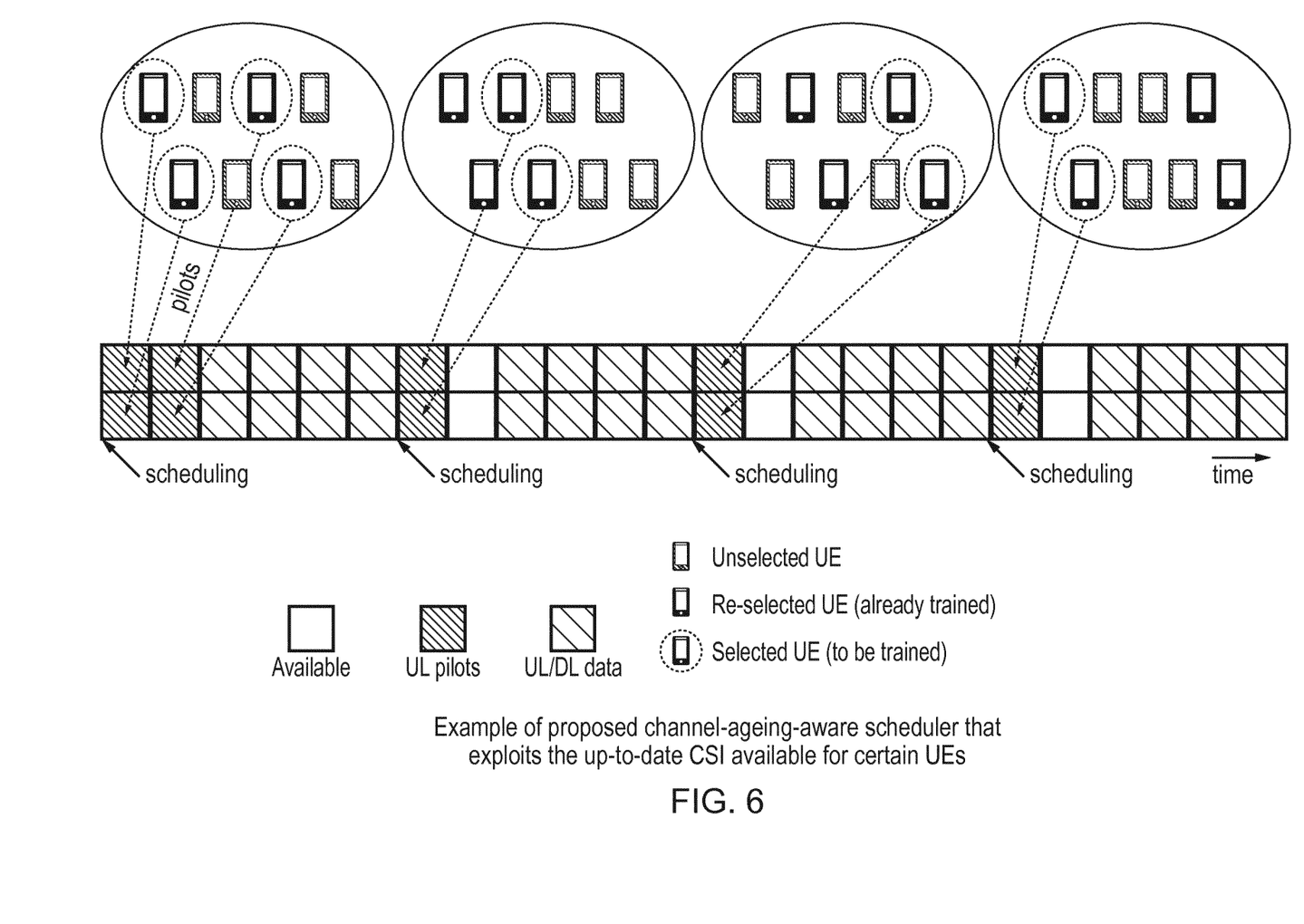
FIG. 6 illustrates schematically operation of one possible channel-ageing-aware scheduler.

FIG. 6 illustrates schematically operation of one possible channel-ageing-aware scheduler. In the arrangement of FIG. 6, a scheduler is configured to account for the fact that up-to-date CSI may be available for some UEs, and that in some cases they can be re-scheduled for consecutive transmissions. In the arrangement shown in FIG. 6, by re-scheduling some UEs and avoiding an unnecessary new training phase, a scheduler is able to make several REs available for data transmission for all UEs, i.e., it increases the overall throughput at all UEs. In the example shown, the throughput gain is $\frac{1}{32} = 19\%$. It will be appreciated that the gain could be much larger depending on the network configuration.

Some aspects provide a method for channel-ageing-aware user scheduling which may be of use in massive MIMO networks. More specifically: some aspects account for the fact that re-scheduling some UEs in consecutive frames can free up resources which may otherwise be used for unnecessary channel estimates, and make those resources available for data transmission, thus increasing overall network throughput.

Scheduling aspects may be simple and scalable to a generic number of UEs and generic coherence times. In practical systems where the majority of UEs are static and their coherence time is long, scheduling methods described may offer a large performance gain compared to a channel-ageing-unaware scheduler. In fact, the latter can prove highly inefficient because its metric ignores the advantage of re-scheduling UEs for consecutive transmissions.

Compared to a channel-ageing-unaware PF scheduling method, a scheduling method which takes into account channel aging may offer a higher network throughput. In particular, FIG. 6 shows a simple example of one possible scheduler, which accounts for the fact that up-to-date CSI is available for some UEs, and that they can be re-scheduled. In the arrangement of FIG. 6, by re-scheduling some UEs and avoiding an unnecessary new training phase, the scheduler is able to make several REs available for data transmission for all UEs, i.e., it increases the overall throughput at all UEs compared to the case of channel-ageing-unaware scheduler depicted in FIG. 5. In particular, FIG. 6 shows how, in the first frame, four UEs are selected and all need training. That is to say, the scheduler is aware that there is no up to date channel estimate available in relation to those UEs. Consequently, four resource elements are used for channel estimation and eight are used for data transmission. In the second frame, the scheduler selects two UEs which were already trained (in the first frame) and whose channel estimates are determined to still be valid, and two UEs which require training. As a result, only two resource elements are required for channel estimation and two resource elements are released to be used for data transmission across all four selected UEs. In other words, ten resource elements are available for data transmission. The same release of resource elements as a result of already having valid channel estimates in relation to some UEs which are selected for scheduling occurs in the third and fourth frames illustrated in FIG. 6.

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

The functions of the various elements shown in the Figures, including any functional blocks labelled as "processors" or "logic", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" or "logic" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included. Similarly, any switches shown in the Figures are conceptual only. Their function may be carried out through the operation of program logic, through dedicated logic, through the interaction of program control and dedicated logic, or even manually, the particular technique being selectable by the implementer as more specifically understood from the context.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The invention claimed is:

1. A method of allocating frame resource elements in a fixed duration frame structure wireless communication network, said method comprising:
   determining respective channel estimates associated with respective ones of a plurality of user equipment to be scheduled in a given fixed duration frame having a fixed duration frame structure;
   assessing whether a respective validity time associated with a respective channel estimate of a respective user equipment of the plurality of user equipment is current or has expired; and
   allocating respective frame resource elements within said fixed duration frame to channel estimation if, according to said assessing, said respective validity time has expired and allocating said respective frame resources to data transmission if, according to said assessing, said respective validity time has not expired.

2. The method according to claim 1, wherein said assessment of whether a validity time associated with the respective user equipment channel estimate is current or has expired comprises: determining an indication of mobility associated with the user equipment.

3. The method according to claim 1, wherein said assessment of whether a validity time associated with the respective user equipment channel estimate is current or has expired comprises: determining a validity time associated with the user equipment.

4. The method according to claim 1, wherein said validity time comprises a whole number of frames.

5. The method according to claim 1, wherein if all of said validity times associated with the entire plurality of user equipment to be scheduled in the fixed duration frame are assessed to have expired, a preselected proportion of said frame resource elements are allocated to channel estimation.

6. The method according to claim 1, wherein if validity times associated with the entire plurality of user equipment to be scheduled in a given frame are assessed to be current, a preselected proportion of said frame resource elements are allocated to data transmission.

7. The method according to claim 6, wherein said preselected proportion of said frame resource elements are allocated to data transmission comprises substantially all resource elements which otherwise were allocated to channel estimation.

8. The method according to claim 1, wherein said wireless communication network comprises a MIMO network in which a base station and user equipment communicate using n antenna, and selecting user equipment to be scheduled in a given frame comprises selecting n/2 user equipment for scheduling.

9. The method according to claim 1, wherein a particular respective user equipment is selected to be a member of the plurality of user equipment to be scheduled in the fixed duration frame in dependence upon whether a respective validity time associated with a channel estimate of the respective particular user equipment is current or has expired.

10. A method according to claim 9, comprising:
performing a search over all possible subsets of schedulable user equipment;
calculating for each possible subset of schedulable user equipment a subset metric which weights user equipment potential instantaneous performance by average performance;
accounting for validity times of all user equipment in a subset and additional throughput associated with frame resource elements which may be allocated to data transmission if said subset of user equipment are scheduled; and
selecting a subset in dependence upon said calculated subset metric.

11. A non-transitory computer readable medium comprising program instructions for causing a base station to at least perform the method of claim 1.

12. A base station configured to allocate frame resource elements in a fixed duration frame structure wireless communication network, said base station comprising:
at least one processor; and
at least one memory including computer program code, the at least one memory and the computer program code configured to, with the at least one processor, cause the base station to at least:
determine respective channel estimates associated with respective ones of a plurality of user equipment to be scheduled in a given fixed duration frame having a fixed duration frame structure;
assess whether a respective validity time associated with a respective channel estimate of a respective user equipment of the plurality of user equipment is current or has expired; and
allocate respective frame resource elements within said fixed duration frame to channel estimation if, according to said assessment, said validity time has expired and allocate said respective frame resources to data transmission if, according to said assessment, said validity time has not expired.

* * * * *